United States Patent [19]

Schmaedeke

[11] 4,025,173

[45] May 24, 1977

[54] SIDE VIEW MIRROR ASSEMBLY

[76] Inventor: Wilbur Schmaedeke, 311 Wisconsin, Frankfort, Ill. 60423

[22] Filed: Mar. 10, 1976

[21] Appl. No.: 665,541

[52] U.S. Cl. .............................................. 350/304
[51] Int. Cl.² .......................................... G02B 5/08
[58] Field of Search .................... 248/476–481, 248/484, 487; 350/299, 302–304, 307

[56] References Cited

UNITED STATES PATENTS

| 2,663,224 | 12/1953 | Younglove | 350/304 |
| 2,916,967 | 12/1959 | Husak | 350/304 |
| 3,375,053 | 3/1968 | Ward | 350/304 X |
| 3,826,563 | 7/1974 | Davis | 350/304 X |

*Primary Examiner*—John K. Corbin
*Assistant Examiner*—F. L. Evans
*Attorney, Agent, or Firm*—Joel Halpern

[57] ABSTRACT

A side view mirror assembly for attachment to a motor vehicle includes a mounting bracket and upper and lower mirrors carried thereon for simultaneous rotation in fixed angular relationship relative to each other. One of the mirrors is rotatable relative to the other to allow the simultaneous rotation of both mirrors in more than one selected fixed angular relationship. A spring-biased detent tooth and a plurality of notches formed respectively on the upper and lower mirrors affords adjustment of the angular relationship between the mirrors and locks the mirrors for simultaneous rotation in the selected angular relationship.

7 Claims, 6 Drawing Figures

SIDE VIEW MIRROR ASSEMBLY

BACKGROUND OF THE INVENTION

The invention relates to side view mirror assemblies and more particularly to mirror assemblies of this character in which upper and lower mirrors are mounted for simultaneous rotation and for relative rotation so as to vary the reflective angles thereof.

Mirror assemblies in which a pair of mirrors are mounted in superposed relation for simultaneous rotation on a mounting bracket and in which one of the mirrors can be rotated independently of the other to thereby vary the angle between the mirrors have been known heretofore. U.S. Pat No. 3,826,563 issued July 30, 1974 to Bernard E. Davis discloses one such mirror assembly construction.

Mirror assemblies of the character to which the present invention and the construction of Bernard E. Davis are directed are intended to effectively cope with the vulnerability of a motorist to the risk of colliding with another vehicle overtaking him on his adjacent lane during a turn owing to a blind spot in the reflective field of the conventional side view and/or rear view mirrors. It was previously considered necessary for the motorist to turn his head in order to reduce the blind area. However, by taking his eyes off the road before him other and additional hazards are created. Therefore, the provision of a mirror assembly which affords an extended and undistorted reflective field, eliminating the aforesaid blind spot has tended to reduce the described risks and hazards. However, mirror assemblies available heretofore have been relatively complex structurally and frequently the attention required to manipulate one mirror relative to the other in order to provide the desired reflective field has itself been a distraction for the motorist which on occasion has resulted in an accident. Further, the mirror assembly constructions available heretofore did not afford ease of assembly and/or disassembly in the event one or both of the mirrors required replacement. It will be appreciated that mirror attachments constitute a form of attractive nuisance in that young children frequently break the reflecting glass or damage the pivotal connection thereby necessitating replacement of one or both of the mirrors. The prior mirror constructions, as the one disclosed in the aforesaid Davis patent, employed a single frame or casing within which both mirrors were mounted and it was either impossible or extremely difficult to replace only one of the mirrors.

SUMMARY OF THE INVENTION

It is one object of the invention to provide a side view mirror assembly having a pair or superposed mirrors which can be moved simultaneously or relative to each other to thereby vary the reflective field affording ease of individual mirror replacement.

It is another object of the invention to provide a side view mirror assembly of the character described which can be easily assembled or disassembled so as to replace a damaged component.

Other objects and advantages of the invention will become readily apparent from the following description of the invention.

According to the present invention there is provided in a side view mirror assembly for attachment to a motor vehicle which includes a mounting bracket and upper and lower mirrors carried by the bracket for simultaneous rotational movement thereon, the improvement comprising:
 a shaft rotatably carried by the mounting bracket;
 a frame-supported upper mirror mounted rotatably on said shaft;
 a frame-supported lower mirror mounted non-rotatably on said shaft;
 a plurality of detent notches formed in the frame on one of said upper and lower mirrors;
 and a spring-biased detent tooth mounted in the other of said mirror frames cooperable selectively with individual ones of said notches, whereby said upper mirror can be rotated about said shaft from a first position in which said mirrors are locked for simultaneous rotation on said mounting bracket in a first fixed angular relationship relative to each other to a second position in which said mirrors are locked for simultaneous rotation on said mounting bracket in a second fixed angular relationship relative to each other.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
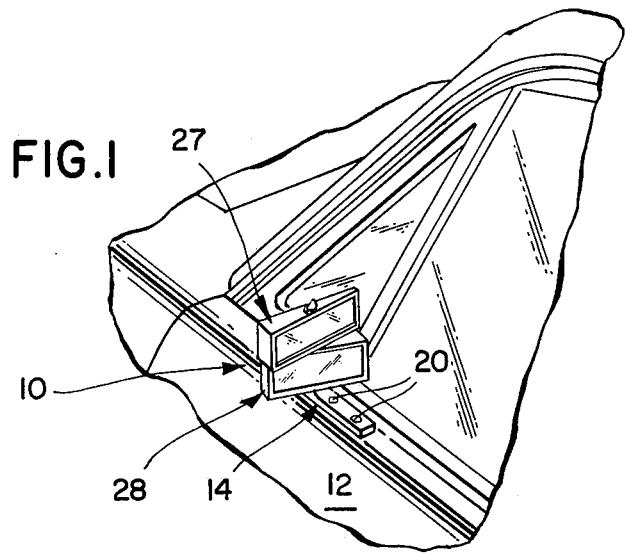
FIG. 1 is a perspective view of a side view mirror assembly embodying the features of the invention and mounted on a motor vehicle.

Referring to the drawings there is shown generally, by reference numeral 10, a side view mirror assembly 10. As depicted in FIG. 1 it is mounted upon a motor vehicle 12 by means of a mounting bracket 14. The mounting bracket desirably includes a pair of flange elements 16, 18, the former being horizontally disposed and provided with a series of apertures adapted to receive a plurality of self-screwing fastening elements 20 which affix the bracket to the motor vehicle. Flange 18 is integral with flange 16 and is formed at one extremity thereof as an upstanding element. Flange 18 is given a horizontal socket 22 which is dimensioned to frictionally receive a ball element 24 at the outer end of a horizontally extending stub shaft 26 secured preferably to a lower mirror 28 as will be subsequently described. Flange 16 is provided with an upsatnding post 30 having a socket 32 therein within which ball element 34 of vertical shaft 36, to be hereinafter described, is frictionally received to thereby permit rotation of the shaft.

The mirror assembly includes a pair of mirrors 27, 28, the mirror 27 being superposed above mirror 28. Both of such mirrors are carried by shaft 36 which is rotatably and preferably universally connected with the mounting bracket upon upstanding post 30 thereof. Thus, in its preferred arrangement shaft 36 is given a ball element 34 at its lower end which is received within socket 32 of the post as described above.

The upper and lower mirrors 27, 28 are desirably mounted in respective frames 38, 40 which may be given vertically aligned openings 42 for the passage therethrough of shaft 36.

In its preferred form upper mirror 27 is rotatably mounted on shaft 36 and is retained thereon by means such as a nut 44 carried by the upper end of the vertical shaft. Mirror 28 is non-rotatably mounted on shaft 36; however it is desirably slidable thereon to facilitate its removal from the shaft during assembly and/or disassembly. A key and slot arrangement (not shown) can be employed to slidably mount mirror 28 on the shaft.

Figure 2:
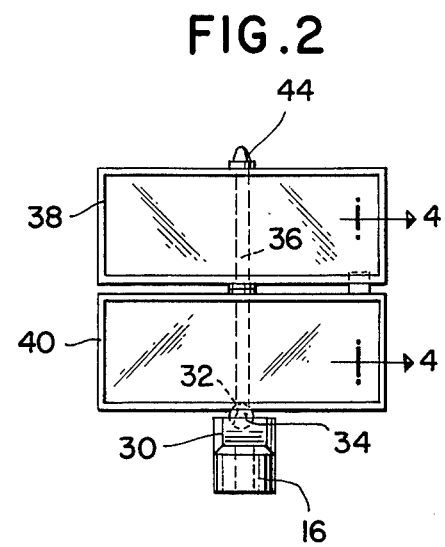
FIG. 2 is a front elevational view of the mirror assembly shown in FIG. 1.
Figure 3:
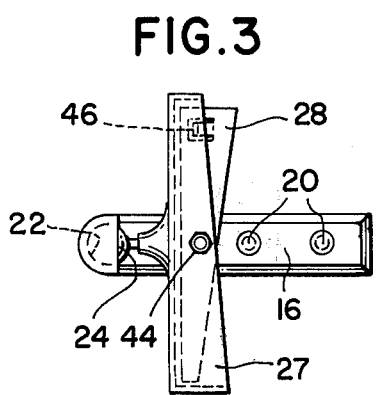
FIG. 3 is a top view of the mirror assembly and mounting bracket shown in FIG. 1.
Figure 5:
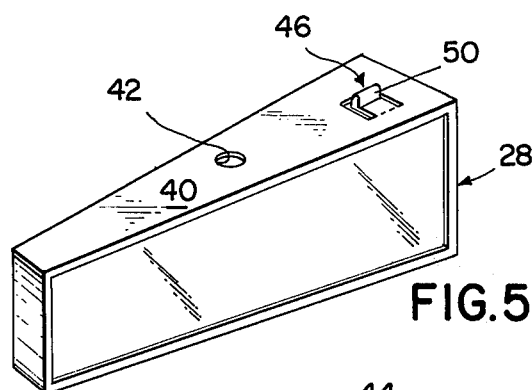
FIG. 5 is a perspective view of the lower mirror illustrating the spring-biased detent tooth projecting upwardly thereof.
Figure 4:
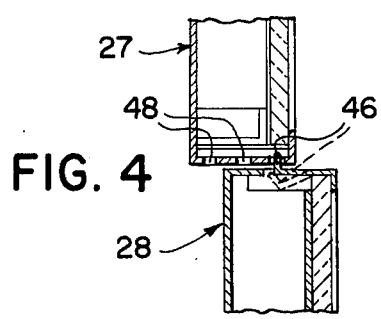
FIG. 4 is a fragmentary view of the mirror assembly shown in FIG. 2, partly in cross-section, and taken along line 4—4 thereof.

Mirror 27 is rotatable relative to mirror 28 so as to vary the angle between the mirrors and thereby adjust the reflective field of the mirrors as desired. In order to provide such relative rotation and to lock the mirrors into the selected angular relationship with each other the mirror frame of one of the mirrors is provided with a spring-biased detent tooth 46 and the other of the mirror frames is formed with a plurality of cooperable detent notches 48. As depicted in FIGS. 2 and 5 the detent tooth is carried by the lower mirror 28 whereas the notches are formed in upper mirror 27. Thus, by providing the vertical faces 50 of the tooth with slightly inclined surfaces the mirror 27 can be moved to any one of several settings to establish the desired angular relationship between the mirrors. In the selected setting or position the tooth is biased upwardly into the notch to lock the mirrors for simultaneous rotation at the selected angular relationship.

Figure 6:
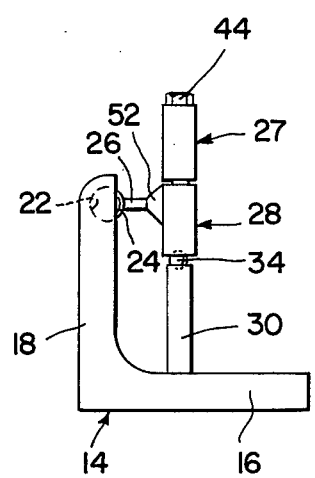
FIG. 6 is a side elevational view of the mirror assembly and mounting bracket shown in FIG. 1.

As briefly described above, flange 18 is provided with a horizontal socket 22 which is dimensioned to frictionally receive ball element 24 at the end of stub shaft 26. From FIG. 6 it can be seen that the stub shaft 26 constitutes an extension of a flange element 52 which may be formed integrally with or secured to the frame 40 of lower mirror 28. The provision of the double pivotal connections between the mirrors and the mounting bracket affords stability for the mirror once it has been set in its selected angular position. Yet, the arrangement of the pair of mirrors upon shaft 36 affords ease of assembly and/or disassembly.

From the foregoing it will be seen that a side view mirror assembly construction has been provided which affords stability for the mirrors in the selected angular setting, which is simple to fabricate and easy to assemble or disassemble by persons having little or no mechanical aptitude or training.

I claim:

1. In a side view mirror assembly for attachment to a motor vehicle which includes a mounting bracket and upper and lower mirrors carried by the bracket for simultaneous rotational movement thereon, the improvement comprising:
    a shaft rotatably carried by the mounting bracket;
    a frame-supported upper mirror mounted rotatably on said shaft;
    a frame-supported lower mirror mounted non-rotatably on said shaft;
    a plurality of detent notches formed in the frame of one of said upper and lower mirrors;
    and a spring-biased detent tooth mounted in the other of said mirror frames cooperable selectively with individual ones of said notches, whereby said upper mirror can be rotated about said shaft from a first position in which said mirrors are locked for simultaneous rotation on said mounting bracket in a first fixed angular relationship relative to each other to a second position in which said mirrors are locked for simultaneous rotation on said mounting bracket in a second fixed angular relationship relative to each other.

2. A side view mirror assembly according to claim 1, wherein said spring-biased detent tooth is mounted in the frame for said lower mirror and projects upwardly therefrom and said notches are formed in the lower portion of said upper mirror frame.

3. A side view mirror assembly according to claim 1, wherein said shaft is frictionally mounted in said mounting bracket for universal pivotal movement.

4. A side view mirror assembly according to claim 1, wherein said shaft extends through said lower and upper mirror frames and retaining means is carried at the upper end of said shaft for retaining said mirrors thereon.

5. A side view mirror assembly according to claim 1, wherein said upper and lower mirror frames are slidably carried by said shaft.

6. A side view mirror assembly according to claim 1, wherein said mounting bracket is pivotably connected by means of a ball and socket joint to at least one of said mirror frames.

7. A side view mirror assembly according to claim 6, including a rearwardly extending shaft integral with said lower mirror frame carrying a ball element at the outer end thereof and an upstanding flange on said mounting bracket having a horizontal socket therein dimensioned to receive said ball element and thereby provide the pivotal connection between said mirror frames and mounting bracket.

* * * * *